United States Patent

Shah et al.

[11] Patent Number: 5,318,104
[45] Date of Patent: Jun. 7, 1994

[54] ERROR BASED ZONE CONTROLLER

[75] Inventors: Dipak J. Shah, Eden Prairie; J. Ward MacArthur, Minneapolis; Robert L. Buchholz, Eden Prairie, all of Minn.; Eric W. Grald, Lyme, N.H.; Lorne W. Nelson, Bloomington, Minn.

[73] Assignee: Honeywell Inc., Minneapolis, Minn.

[21] Appl. No.: 946,243

[22] Filed: Sep. 16, 1992

Related U.S. Application Data

[63] Continuation of Ser. No. 722,626, Jun. 27, 1991, abandoned.

[51] Int. Cl.⁵ .................................................. F24F 7/00
[52] U.S. Cl. ........................................ 165/22; 236/49.3
[58] Field of Search ............... 163/22; 236/49.3, 1 B; 237/8 R

[56] References Cited

U.S. PATENT DOCUMENTS

| | | | |
|---|---|---|---|
| 3,482,623 | 12/1969 | Betz | 165/22 |
| 3,949,807 | 4/1976 | Tyler | 165/22 X |
| 4,071,745 | 1/1978 | Hall | 165/22 X |
| 4,545,524 | 10/1985 | Zelczer | 165/22 X |
| 4,600,144 | 7/1986 | Zelczer | 165/22 X |
| 4,616,325 | 10/1986 | Heckenbach et al. | 165/22 X |
| 4,630,221 | 12/1986 | Heckenbach et al. | 165/22 X |
| 4,635,445 | 1/1987 | Otsuka et al. | 165/22 X |
| 4,716,957 | 1/1988 | Thompson et al. | 165/22 X |
| 4,718,021 | 1/1988 | Timblin | 165/22 X |
| 4,830,095 | 5/1989 | Friend | 165/22 |
| 5,024,265 | 6/1991 | Buchholz et al. | 165/22 |

Primary Examiner—John Rivell
Attorney, Agent, or Firm—Ronald E. Champion

[57] ABSTRACT

The present invention describes an apparatus and method for controlling the temperature in a plurality of comfort zones within a house or building. The invention contemplates a series of zone control devices which are selectively opened or closed to allow heating and/or cooling to individual zones. The temperature in each zone is sensed and compared to a preferred setpoint temperature to determine a temperature error for each zone. The respective temperature error signals for each zone are used to determined the zone of greatest thermal error. The zone of greatest thermal error is used to turn the heating/cooling plant on and off. The remaining zone or zones of lesser thermal error have their zone control devices closed or opened, depending upon the temperature error signal for their respective zones. In this manner, all zones are synchronized to the zone of greatest thermal error and to the cycle of the heating-/cooling plant.

21 Claims, 10 Drawing Sheets

ERROR BASED ZONE CONTROLLER

This application is a continuation of application Ser. No. 07/722,626, filed Jun. 27, 1991 now abandoned.

TECHNICAL FIELD

This invention relates to a method and apparatus for controlling the temperature of a plurality of heating and cooling comfort zones by use of a single heating/cooling plant. Specifically, the apparatus uses a temperature error signal for each zone to control the heating or cooling to that particular zone.

BACKGROUND OF THE INVENTION

Typically, homes with conventional heating and cooling equipment are controlled with a single thermostat which controls the air temperature correctly only in it's own vicinity. Many of these homes will experience temperature variations during both the heating and cooling seasons. In large part, this is due to solar gains, internal loads, outdoor wind, open stairways and many other more subtle factors.

In forced air heating and cooling systems, continuous fan operation can alleviate non-uniform heating and cooling somewhat, but tends to be expensive. Further, in the cooling season, continuous fan operation may cause higher than desirable humidity due to evaporation from a wet evaporator coil while the compressor is off.

In response to these problems and a desire for greater comfort and flexibility, zoned systems have been developed. In these zoned systems, dampers are placed in the ductwork and a thermostat is placed in each zone. Thus, warm or cool air is distributed only where it is needed.

However, control strategies for these zoned systems using a conventional single-firing rate furnace with a single-speed blower and single-speed air conditioner are not necessarily simple. Present day control of zoned systems allow each individual thermostat to turn on the heating/cooling plant and simultaneously open the corresponding zone damper, while closing the dampers to other zones not requiring heating/cooling. With several individual thermostats independently turning the heating/cooling plant on and off, it will cycle significantly more than normal. This has a potential of shortening the life of the equipment. It is, therefore, important to coordinate the thermostat calls and to take advantage of the plant while it is on.

Additionally, when only one zone calls for heat, the entire output of the heating plant (which is capable of heating the entire house) will be supplied to that zone causing larger than normal temperature fluctuations in that zone's air temperature. At the same time, air flow through the furnace is reduced and causes an increase in stack losses and, as a result, the average plenum temperature is increased and the overall furnace efficiency is decreased If the plenum temperature becomes too high because of reduced flow, the furnace burner safety switch will function (high limit operation) and shut off the burner until it has cooled to a preset level. If only one zone continues to call for heat over an extended period of time, the burner may cycle off and on repeatedly from the burner safety switch (called high limit operation). Similarly, in the cooling season, reduced air flow over the evaporator coil decreases the air temperature in the ductwork, possibly leading to ice formation on the cooling coil.

One solution to these problems has been proposed in U.S. patent application, Ser. No. 07/451,705, filed on Dec. 18, 1989, and assigned to the assignee of the present invention. In that patent application, a thermostat in the zone of greatest thermal demand is used to control both a duct damper for that zone and the heating/cooling plant. The remaining thermostats in the zones of lesser thermal demand have their cycle rate and, hence, their duty cycles modified so that they control their respective duct dampers in synchronization with the "on" period of the thermostat of the zone of greatest demand.

Although this approach has been successful, the present invention discloses another more sophisticated and improved solution to this problem.

SUMMARY OF THE INVENTION

An object of the present invention is to provide an improved zone control system which determines the difference between the actual measured temperature and a preferred setpoint temperature in each zone, and designates a zone of greatest thermal error which cycles the heating/cooling plant on and off.

Another object of the invention is to provide an improved zone control system which can repeatedly select between a zone of greatest thermal error and zones of lesser thermal error by incrementally and periodically determining the error in each comfort zone by calculating a function of the difference between a preferred setpoint temperature and an actual measured temperature.

Another object of the invention is to provide an improved zone control system for a plurality of comfort zones, wherein only one zone at a time will control the on/off cycle of a heating/cooling plant.

The present invention accomplishes these and other objects by providing a temperature sensor and a preferred temperature setpoint apparatus in each of the plurality of comfort zones. A zone control device such as a duct damper is provided for each of the comfort zones. A controller receives a signal representative of the measured temperature and the preferred setpoint temperature and determines an error signal for each zone. The controller may base the error signal on strictly the difference between the measured temperature and the preferred setpoint temperature for proportional control It should be noted, however, that the difference may be integrated over time to develop an integral error signal for integral control, differentiated for differential control, or may be based on any combination of proportional, integral or differential control as is known in the art. The error signals are used to determine a zone of greatest thermal error. The error signal for the zone of greatest thermal error either turns the heating/cooling plant on or off, depending upon is relative value. All of the remaining zones are designated as zones of lesser thermal error, and their error signals close their respective duct dampers if the plant is on, or retain their respective duct dampers closed if the plant is off. The zone controller periodically redetermines the zone of greatest thermal error by excluding those zones of lesser thermal error whose own duct damper has been closed since the start of a plant "on" cycle. The plant "on" cycle is determined by the software loaded in the controller. The process continues until all zone duct dampers, except the duct damper of the zone of greatest thermal error, have been closed and the error for the zone of greatest thermal error minus an anticipation value is below a predetermined level known as the "break point", where upon the heating/cooling plant is turned off until the zone of greatest thermal error's temperature error exceeds a predetermined level known as the "make point."

Other objects and advantages of the present invention will be apparent from the following description of a preferred embodiment thereof and from the attached drawings.

BRIEF DESCRIPTION OF THE DRAWINGS

FIG. 10b is a continuation of the second alternate subroutine for setting commands for zone control devices of FIG. 10a.

DETAILED DESCRIPTION OF THE INVENTION

Figure 1:
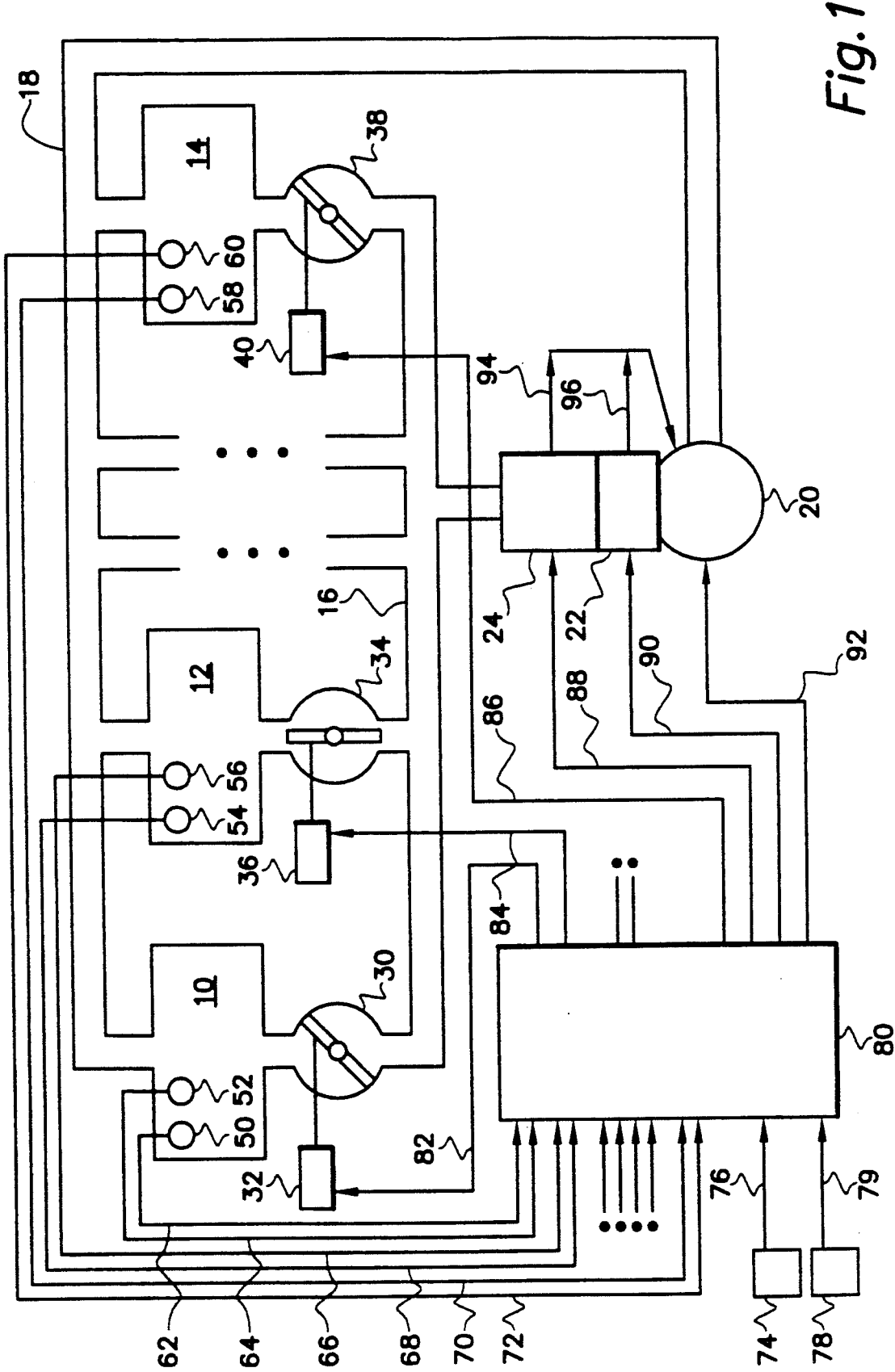
FIG. 1 is a block diagram of the apparatus to control heating/cooling in a multitude of comfort zones.

Referring to FIG. 1, it can be seen that a plurality of comfort zones 10, 12 and 14 are provided in a typical home or building. Each zone may be a separate room, a floor or a combination thereof. Air supply duct 16 is a distribution system which supplies conditioned inlet air to each of the zones 10, 12 and 14. In the representation shown in FIG. 1, zone 10 would be the first zone, zone 12 would be the second zone and zone 14 would be the Nth zone of the plurality of zones.

An air return duct 18, which is open at all times, allows the room air to flow back to an air circulation device 20. The air circulation device 20, such as a fan which when activated allows air to flow through a heating plant 22 and a cooling plant 24, as is known in the art.

Zone 10, or the first zone, has a damper 30 in the branch of the air supply duct 16. A damper actuator 32 controls duct damper 30. Similarly, the second comfort zone 12 has a duct damper 34 and a duct damper actuator 36 associated with it. In FIG. 1, duct damper 30 is shown in the closed position and duct damper 34 is shown in the open position. Each of the respective comfort zones has a similar duct damper and duct damper actuator associated with it.

The Nth zone, or zone 14, has a duct damper 38 within the branch of the air supply duct 16 leading to zone 14 and a duct damper actuator 40 associated with duct damper 38.

Each of the respective zones has a temperature setting device and a temperature measuring device, such as temperature setting device 50 and a temperature measuring device 52 in the first zone, or zone 10. Similarly, the second zone, or zone 12, has temperature setting device 54 and temperature measuring device 56. Each of the respective zones is similarly equipped until zone 14, which is zone N, which has a temperature setting device 58 and a temperature measuring device 60.

Each of the temperature setting devices 50, 54 and 58, and each of the temperature measuring devices 52, 56 and 60 generate signals which are transmitted by means of signal lines 62, 64, 66, 68, 70 and 72 to a controller 80.

It should be clear to one skilled in the art that each signal line 62, 64, 66, 68, 70 and 72 may be a single wire with a common ground or a two-wire pair. It should also be clear to one skilled in the art that the number of signal lines may be reduced by computing the difference between the measured temperature and the setpoint temperature within each zone and only transmitting a single signal from each zone representing the temperature error to controller 80.

The controller 80 may base the error signal on strictly the difference between the measured temperature and the preferred setpoint temperature for proportional control. It should be noted, however, that the difference may be integrated over time to develop an integral error signal for integral control, differentiated for differential control, or may be based on any combination of proportional, integral or differential control as is known in the art.

A switch 74, which is settable to indicate plant operating mode which may be heating, cooling, auto changeover or off, transmits its signal on signal line 76 to controller 80. Manual/auto fan switch 78 transmits its signal over a signal line 79 to controller 80. Controller 80 has an output signal line 82 to the duct damper actuator 32 which opens or closes duct damper 30. Another signal line 84 is connected between controller 80 and duct damper actuator 36 to open or close duct damper 34. Controller 80 has a similar output for each zone, including zone 14, which is comfort zone N, which has a signal line 86 from controller 80 to duct damper actuator 40 for opening or closing duct damper 38. Controller 80 also has an output control line 88, which can turn the cooling plant 24 on or off, and a signal actuating line 90, which can turn the heating plant 22 on or off.

The air circulating fan 20 may also be controlled by controller 80 by means of signal line 92. The heating plant 22 can independently control fan 20 over signal line 94.

Figure 2:
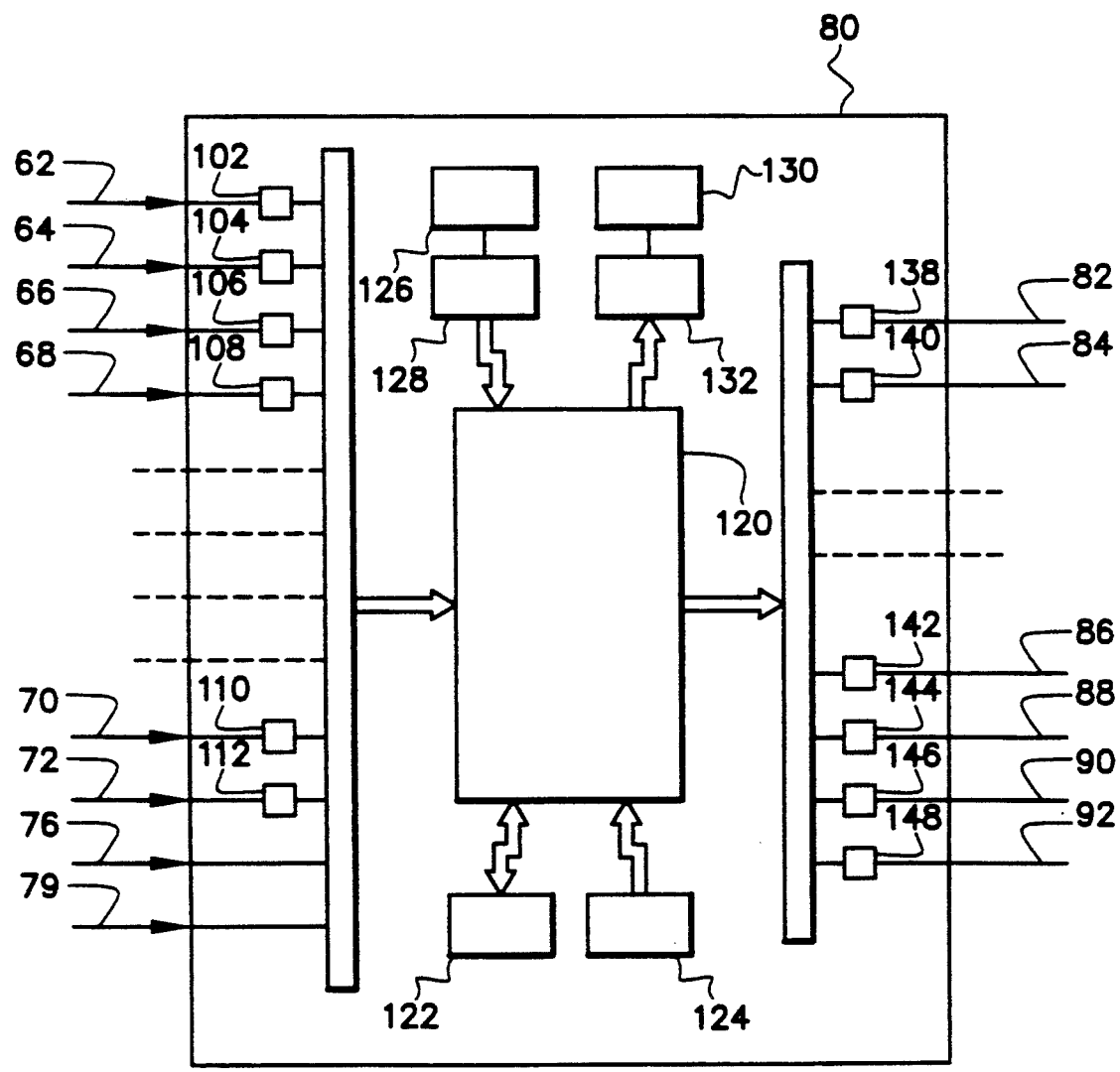
FIG. 2 is a block diagram of a controller for controlling the apparatus shown in FIG. 1.

Referring now to FIG. 2, the signals received by the controller 80 on signal lines 62, 64, 66, 68, 70 and 72 all carry analog signals which may be converted into digital signals by means of analog-to-digital converters 102, 104, 106, 108, 110 and 112. These digital signals are conditioned by an input interface device 114 and fed to a microprocessor 120. Signal lines 76 and 79 are merely on/off signals and may be considered to be digital and not require any conversion, but are inputted directly to input interface device 114 and then to microprocessor 120. Microprocessor 120 has associated with it a memory 122 and a clock 124. Additionally, an input device 126 such as a keyboard or a series of switches may be inputted to the microprocessor 120 through an input interface 128. Similarly, an output device 130, such as a CRT or LCD, may be used for presenting information by taking signals from the microprocessor 120 through an output driver 132. The microprocessor 120 is also connected to an output interface device 136 which can then generate output control signals which are transmitted over output signal lines 82, 84, 86, 88, 90 and 92.

Figure 3:
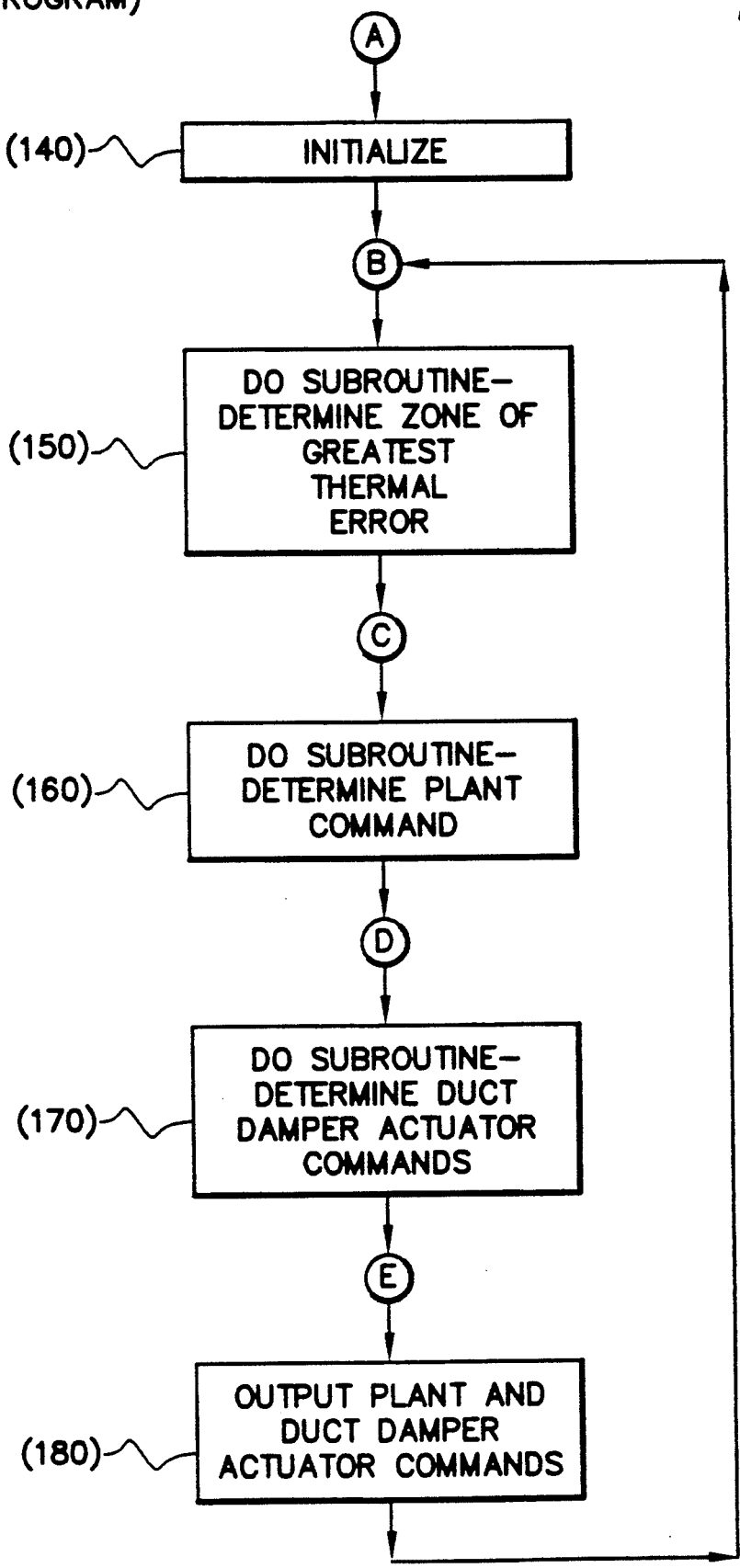
FIG. 3 is a flow chart of a program for operating a controller of the present invention.

Referring now to FIG. 3, a program loaded in the memory 122 of the controller 80 is shown in detail. The program has several functional blocks. The first functional block 140 is used to load the various constants and to initialize the program. The second functional block 150 is a subroutine to determine the zone of greatest thermal error. The third functional block 160 is a subroutine to determine whether or to the heating/cooling plant should be on or off. The fourth functional block 170 is a subroutine to determine the commands for each of the duct damper actuators to each of the zones. The last functional block 180 executes the commands determined in the third block 160 and the fourth block 170. The program continues to loop through the second, third, fourth and fifth block as a continuously running program.

Figure 4:
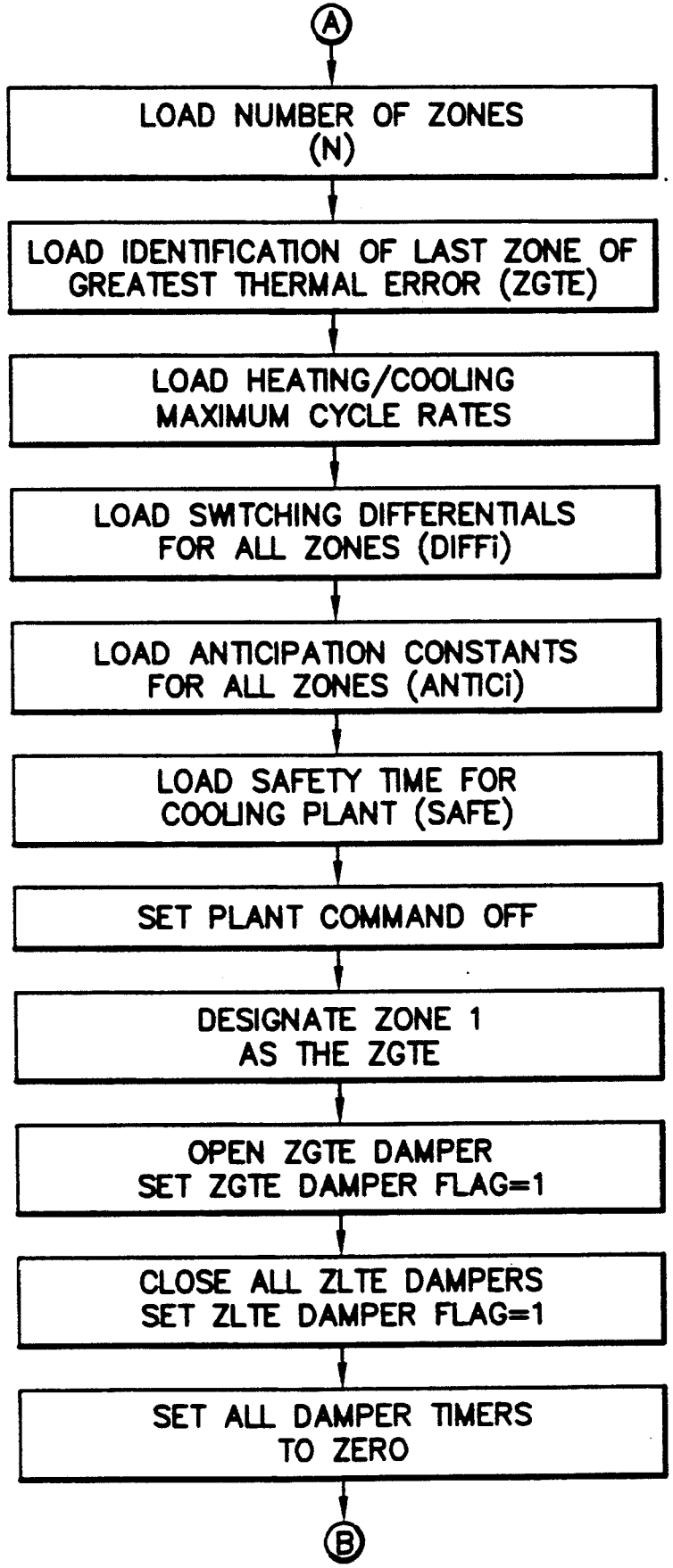
FIG. 4 is a subroutine for initializing the program shown in FIG. 3.

Referring now to FIG. 4, the first block 140 of FIG. 3, or the initialization step, is shown in detail. The number of zones to be controlled is loaded. This is necessary in order to increment the program through its various loops so that each zone is polled in sequence. The identification of the last zone of greatest thermal error is also loaded. This allows us to start the program assuming that one of the zones had a thermal error greater than the remaining zones at the beginning of the program. The cycling rates for the heating and cooling modes are also loaded. A switching differential is loaded for each zone. This differential provides hysteresis to eliminate short cycling. An anticipation function is loaded for each zone. The anticipation function is a function which is added or subtracted to the error of each individual zone to prevent the sensed temperature from overshooting the setpoint temperature. The heating and cooling cycle rates, switching differentials and anticipation functions may or may not be the same for each zone. A safety time, which is the duration of time for which the cooling plant must remain off between "on" cycles, is also loaded. This safety time prevents the cooling plant from being started prematurely, possibly damaging the compressor. The plant command is then set to an "off" condition. The zone of greatest thermal error damper is opened and a flag is set to one indicating that this particular damper is open. All of the remaining dampers, which are now for zones of lesser thermal error, are closed and a flag is set to one for each of these dampers. All damper timers are initialized to zero.

Figure 5:
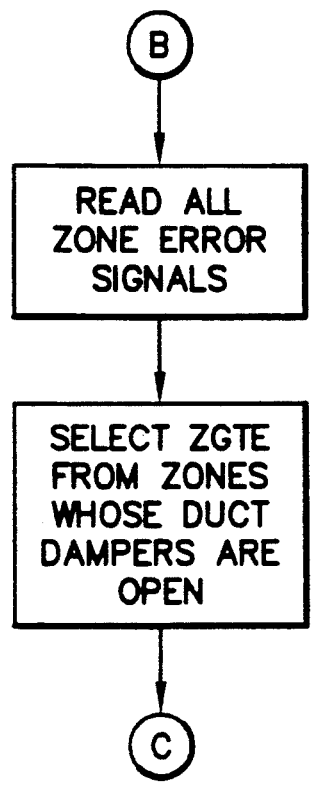
FIG. 5 is a subroutine for determining a zone of greatest thermal error.

Referring now to FIG. 5, which is the subroutine to determine the zone of greatest thermal error as shown in block 150 of FIG. 3, is begun by reading error signals from all zones. The temperature error may be the difference between the measured temperature and the setpoint temperature or the error signal may be the integral of the difference between the measured temperature and the setpoint temperature. If the integral of the error is used, this would provide "droopless" control of the zone sensed temperature. The determination of the zone of greatest thermal error takes into account only those zones which have their duct dampers open. The zone of greatest thermal error may change and, therefore, those zones whose duct damper have been closed during this plant "on" cycle, may be again included in the determinations of the zone of greatest thermal error if their temperature error exceeds a preset amount. This would allow a zone which currently has its damper closed and its setpoint temperature readjusted, to be reintroduced into the pool of zones used for determining the zone of greatest thermal error. In this manner, the control algorithm can take account of instantaneous setpoint temperature changes within any given zone.

Figure 6:
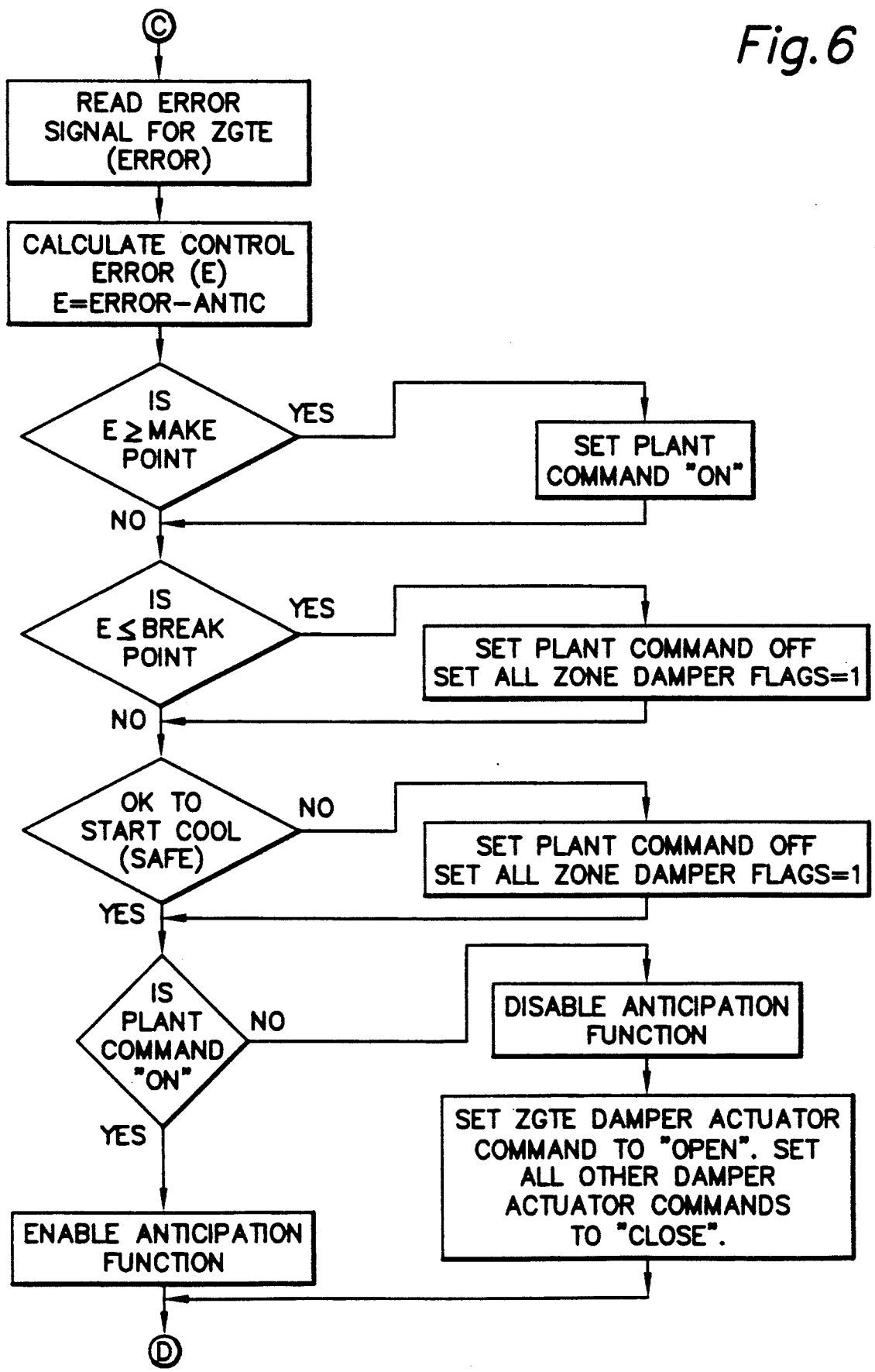
FIG. 6 is a subroutine for setting the plant operating commands.

Referring now to block 160 of FIG. 6, the subroutine for determining the plant commands is shown in detail. The error signal for the zone of greatest thermal error is read. Then a control error signal (E) is calculated by subtracting the anticipation function ($ANTIC_i$) for that particular zone from the temperature error ($ERROR_i$) for that particular zone. A query then is made as to whether or not this error signal (E) is greater than or equal to a make point. If it is, the plant command is set to "on." If it is not, then the error signal (E) is checked to see if it is less than or equal to a break point. If it is, the plant command is set to "off" and all zone duct damper flags are set to equal one, indicating that all the dampers are closed except for the zone of greatest thermal error, whose duct damper is open. If the operating mode is cooling and if the plant command has changed from "off" to "on", then we ask whether or not the safe time has been exceeded. If it has not, we set the plant command to "off". In this way, the controller will not start this particular cooling cycle in under the safe amount of time. We set all duct damper flags for all zones to equal one. If the operating mode is heating or if the safe time has been exceeded in the cooling mode, then we ask whether or not the plant command is on. If it is not on, we disable the anticipation function. If the plant is on, we enable the anticipation function for the plant. Setting the zone damper flags as indicated above ensures that all zone dampers are permitted to open at the beginning of a new plant cycle.

Figure 7:
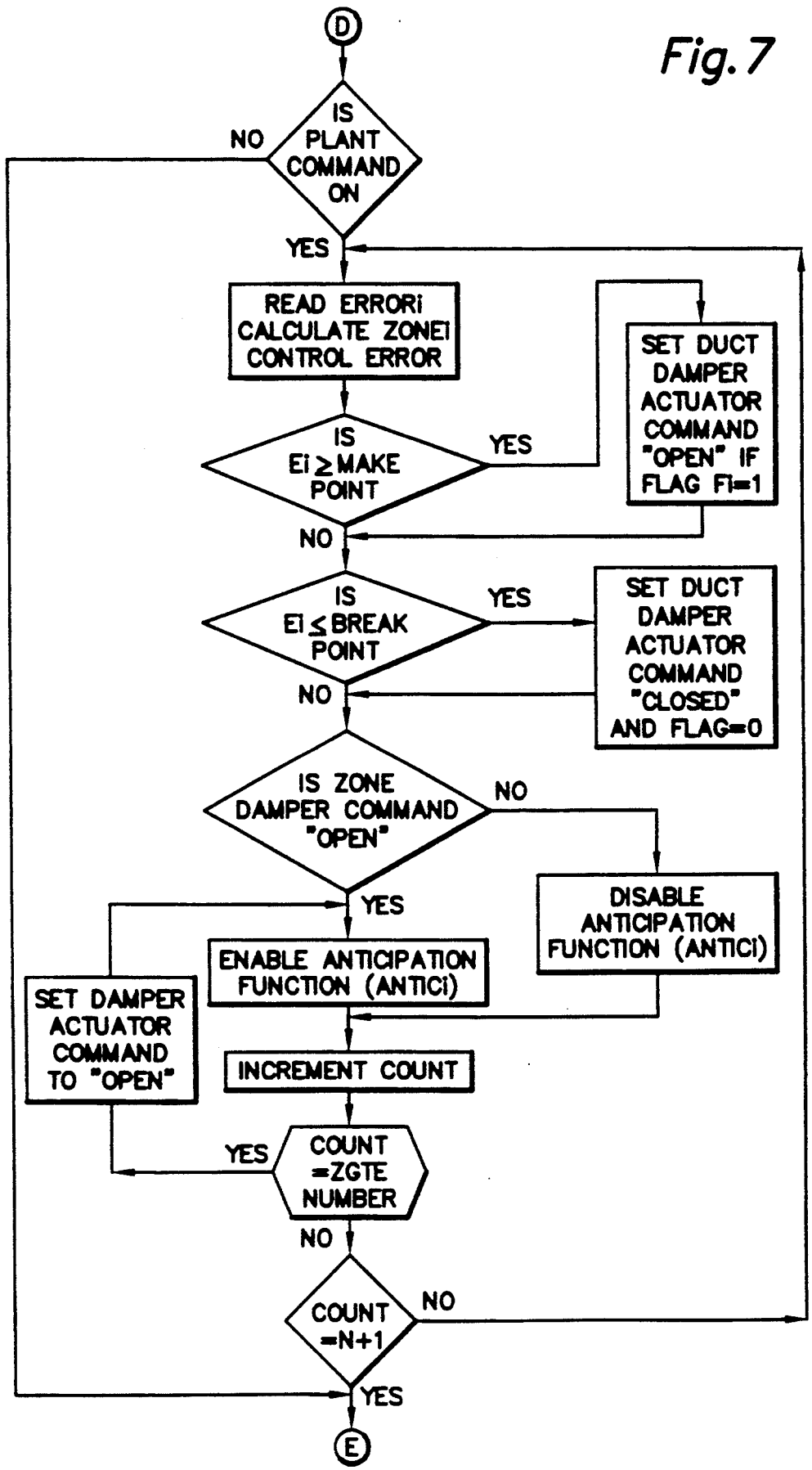
FIG. 7 is a subroutine for setting commands for zone control devices.

Referring now to FIG. 7, the fourth block 170 of FIG. 3, which is the subroutine for determining the zone duct damper actuator commands, is shown in detail. We first ask if the plant command from the subroutine 160 of FIG. 6 is "on." If the plant command is not on, then we bypass all of our zone damper actuator control commands and go to the bottom of this flowchart. If the plant command is on, the error signals ($ERROR_i$) for each zone is read and a damper control error ($E_i$) is calculated for each zone which will be the error signal ($ERROR_i$) for that particular zone minus the anticipation function ($ANTIC_i$) for that zone. We then ask if this error ($E_i$) for this particular zone is greater than or equal to the make point. If it is, we set that zone duct damper actuator command "open" if the flag for that particular zone damper equals one. If the damper control error for that particular zone is not greater than or equal to the make point, then we ask whether or not the damper control error for that particular zone is less than or equal to the break point. If it is, we set that zone damper actuator command to "closed" and its flag equal to zero. This will cause that particular zone damper to close and not reopen during this plant "on" cycle. If the damper control error is not less than or equal to the break point, then we ask if the damper actuator command is "open". If it is not open, we disable the anticipation function ($ANTIC_i$). In other words, we do not need to correct for the error signal while the damper is closed. If the damper actuator command is open, we enable the anticipation function for that particular zone. We increment the zone count and ask if this is the zone of greatest thermal error. If it is, we ensure that the duct damper actuator command is set to "open" and loop back to ensure that anticipation is enabled and then increment the count. If it is not the zone of greatest thermal error, we ask whether or not we have queried all zones. In other words, is the count equal to the number of zones (N) plus one. If it is not, we loop back and continue until all zones have been queried. Once all zones have been queried, we then output, as shown in the fifth block 180 of FIG. 3, the plant and the duct damper actuator commands and repeat the cycle through the subroutine blocks 150, 160, 170 and 180 as shown in FIG. 3.

Figure 8:
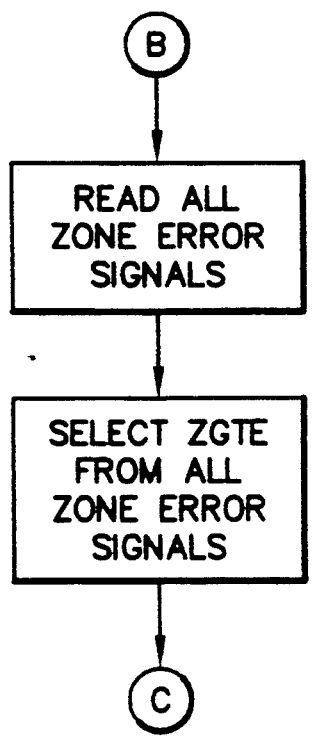
FIG. 8 is an alternate subroutine for determining the zone of greatest thermal error as shown in FIG. 5.

In the preferred embodiment described above, and as shown in FIG. 5, in determining the zone of greatest thermal error we considered only those zones whose duct dampers are open while the plant was on. That is, whose flags equal one. It may be preferable, as shown in FIG. 8, in an alternate embodiment for determining the zone of greatest thermal error to consider all the zones regardless of whether their duct damper is opened or closed. In this alternate embodiment, a zone of lesser thermal error which previously had its duct damper closed during this plant "on" cycle, may be considered the zone of greatest thermal error for this particular loop of the program if it now has the largest temperature error and have its duct damper reopened.

In the preferred embodiment of the zone duct damper actuator command subroutine 170 shown in FIG. 7, the errors were used to determine whether and when the duct dampers for each particular zone should be closed. An alternate embodiment, shown in FIG. 9, uses the duct damper timers in conjunction with the temperature errors to determine when the individual duct dampers should be closed for the duration of this plant "on" cycle.

Figure 9:
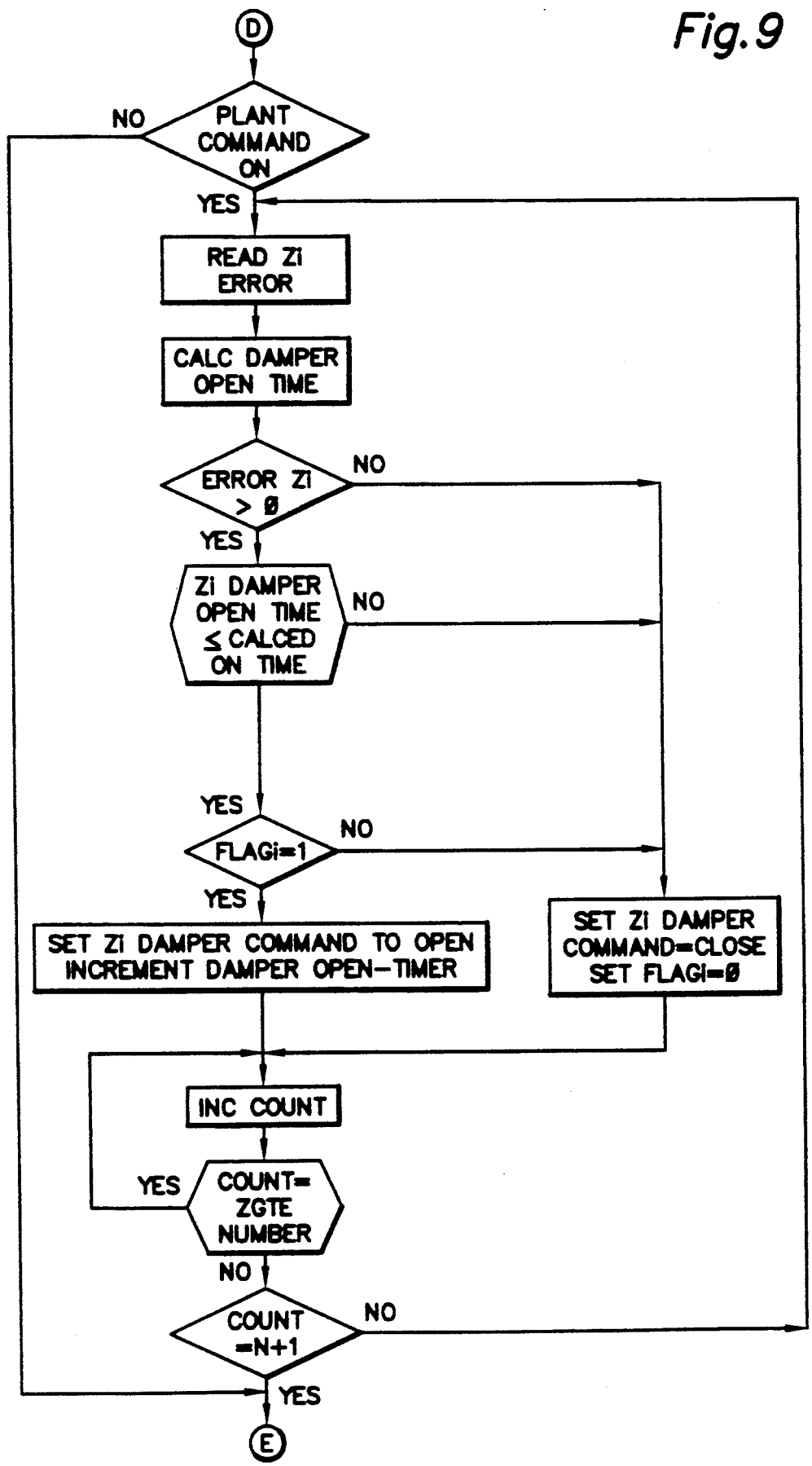
FIG. 9 is an alternate subroutine for setting commands for zone control devices as shown in FIG. 7.

Referring now to FIG. 9, an alternate for determining zone duct damper actuator commands, we first ask whether or not the plant is on. If the plant is not on, we bypass this subroutine. If the plant is on, we read each zone's error signal ($ERROR_i$). We then calculate an amount of time that each duct damper for each zone should be on or open in order to satisfy that particular zone's heating or cooling needs. We then ask if the temperature error for that zone is greater than zero. If the temperature error is not greater than zero, we set that zone's damper actuator command to close and we set that zone damper flag to equal zero. If the temperature error is equal to or less than zero, we ask if the duct damper has been open for a time that is less than or equal to the calculated time that the duct damper should be open. If this time has been exceeded, we set the duct damper actuator command for that particular zone to close and set its flag equal to zero. If the duct damper has been open for a time period less than the computed "open" time, we ask if that duct damper's flag equals one. If it is not equal to one, we then set the duct damper actuator command to "close" and we leave its flag to zero. If the duct damper flag equals one, we set that duct damper actuator command to "open" and we increment the "on" timer to indicate the total amount of time that particular duct damper has been open. We then increment the count and ask if this is the zone of greatest thermal error. If it is, we increment the count again. If it is not, we then ask if we have completed querying all the zones. In other words, is the count equal to N+1. If we have not, we loop back up until all of the zones have been completed.

Figure 10A:
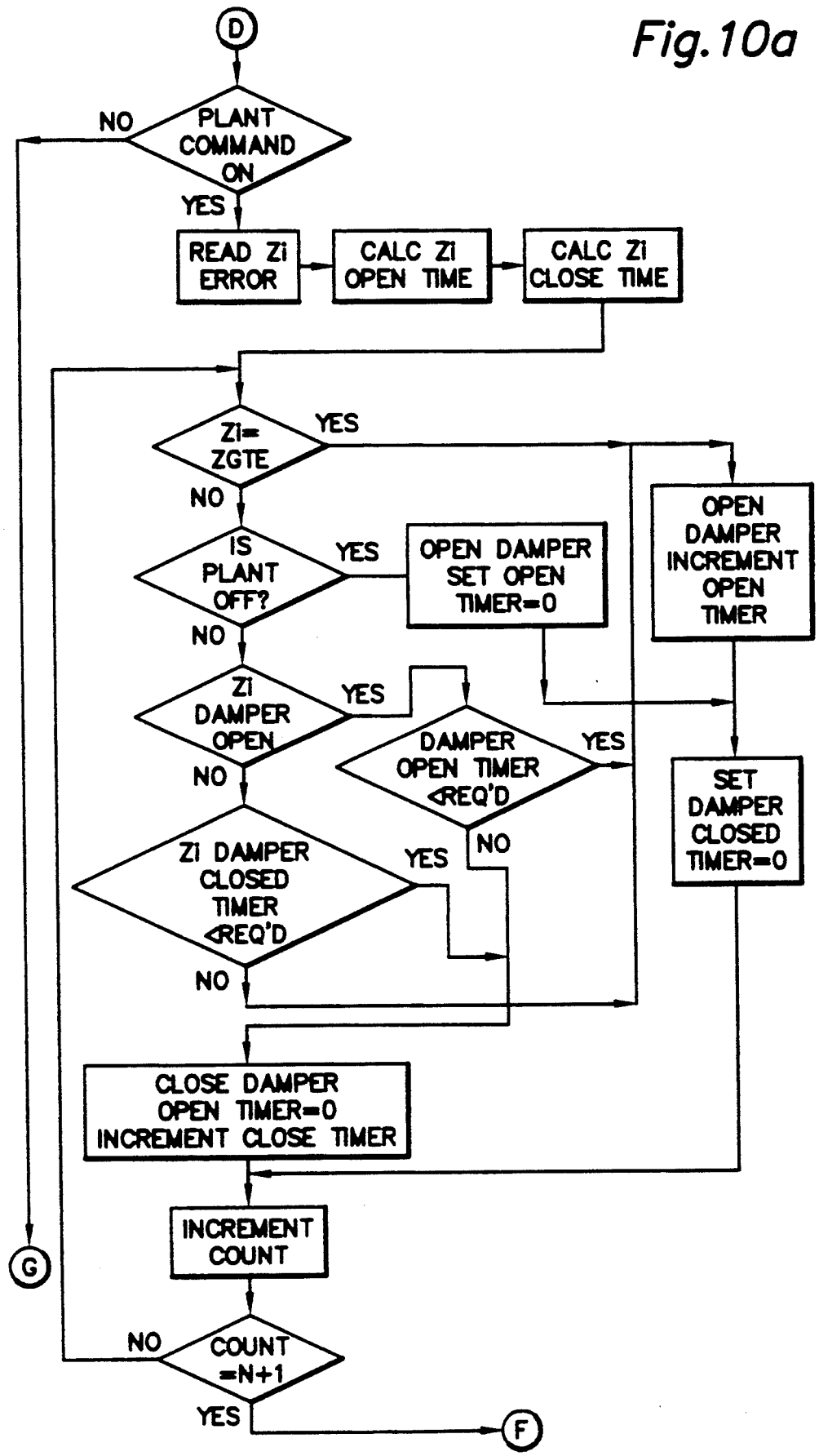
FIG. 10a is a portion of a second alternate subroutine for setting commands for zone control devices as shown in FIG. 7.
Figure 10B:
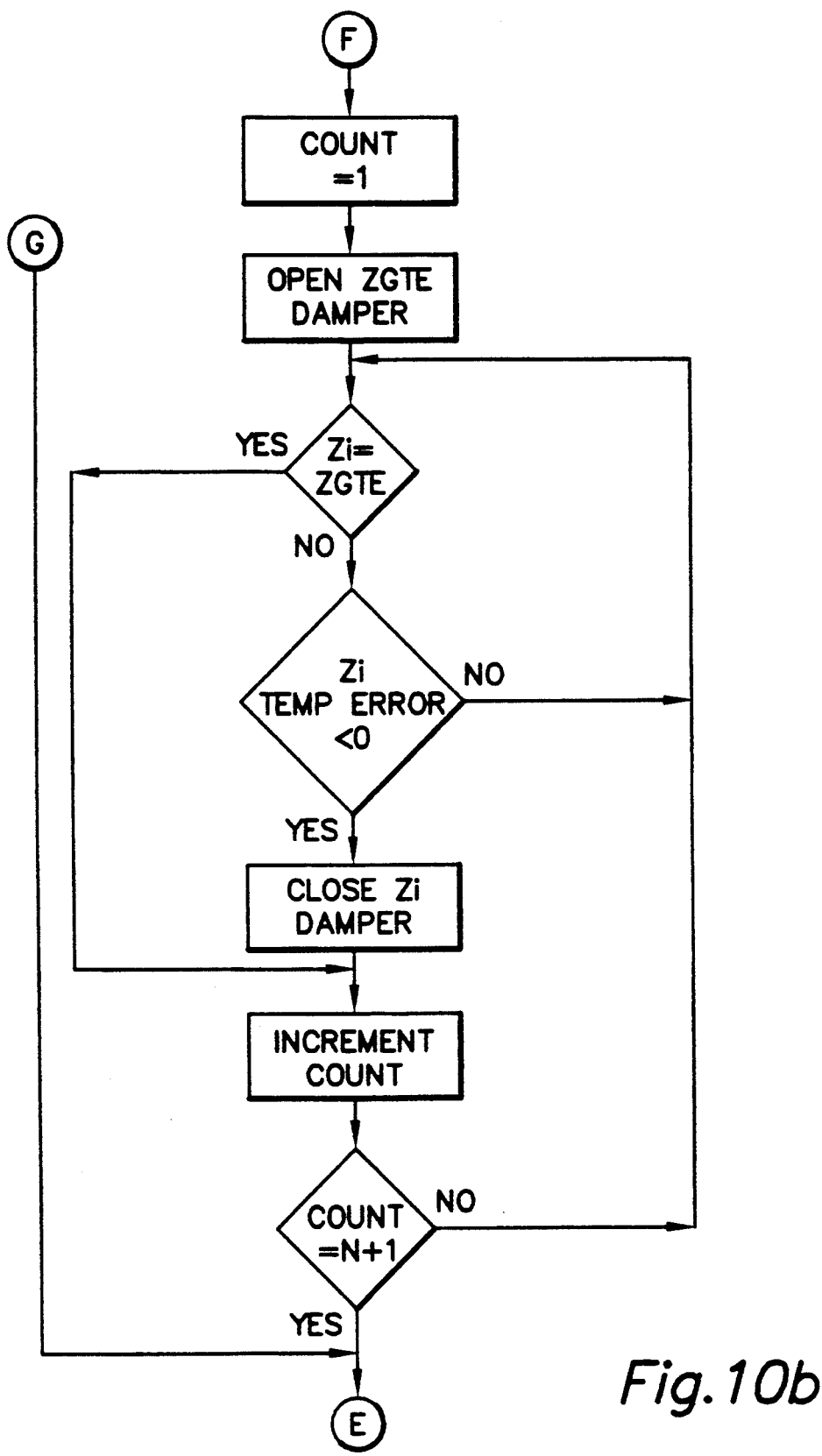

A further alternate for determining zone duct damper actuator commands is shown in FIGS. 10a and 10b. In this particular subroutine, we add the additional step of calculating the zone damper off-time along with computing the on-time. This will give control over both duct damper open time and duct damper close time. The additional subroutine also insures that the duct damper for the zone of greatest thermal error remains open at all times.

Having illustrated and described the principles of the invention in a preferred embodiment, it should be apparent to those skilled in the art that the invention can be modified in arrangement and detail without departing from such principles. Specifically, it is noted that the above disclosure has been described in the context of a forced air system, but is equally applicable to a hydronic system, wherein fan 20 is a pump, ducts 16 and 18 are pipes, zone dampers 30, 34 and 38 are valves and duct damper actuators or valve actuators. We claim all modifications coming within the spirit and scope of the following claims.

We claim:

1. A zone control apparatus comprising:
   a plurality of comfort zones;
   of zone temperature sensor means, one in each of said plurality of comfort zones for generating a first signal representing the temperature of its respective comfort zone;
   a plurality of zone setpoint temperature input means, one for each of said plurality of comfort zones for generating a second signal representative of a preferred temperature for its respective comfort zone;
   a plurality of zone control means, each for controlling one of said plurality of comfort zones;
   a zone controller means for determining a zone temperature error for each of said plurality of comfort zones based upon said first signal for each of said comfort zones and said second signal for each of said comfort zones, for identifying a zone of greatest thermal error distinct from zones of lesser thermal error, for determining a time for which each respective one of said zone control means should be opened, for controlling the opening and closing of said zone control means based upon said zone temperature errors or said time; and
   synchronizing means for synchronizing a heating-/cooling plant on/off cycle to open/close said zone control means.

2. A zone control apparatus as recited in claim 1 wherein said zone control means includes a means for determining said zone temperature errors as the difference between said first signal and said second signal from each of said plurality of comfort zones.

3. A zone control apparatus as recited in claim 1 wherein said zone controller means includes an integrating means for integrating a difference between said first signal and said second signal of each of said comfort zones for determining said zone of greatest thermal error.

4. A zone control apparatus as recited in claim 1 wherein said heating/cooling plant is a forced air system.

5. A zone control apparatus as recited in claim 4 wherein said zone control means includes a duct damper for each of said plurality of said comfort zones.

6. A zone control apparatus as recited in claim wherein said heating/cooling plant is a hydronic system.

7. A zone control apparatus as recited in claim 6 wherein said zone control means includes a valve for each of said plurality of said comfort zones.

8. A zone control apparatus comprising:

an error measurement means for determining a temperature error for each of a plurality of comfort zones;

a plurality of zone control means, one for each of said plurality of comfort zones;

a program means for identifying a zone of greatest thermal error based upon said temperature error distinct from zones of lesser thermal error, for opening a zone control means for said zone of greatest thermal error; and a zone controller means for opening all zone control means and for selectively closing zone control means of zones of lesser thermal error based upon said temperature error for each of their respective plurality of comfort zones.

9. A zone control apparatus as recited in claim 8 wherein said error measurement means includes a zone temperature sensor means in each of said plurality of zones for generating a first signal representing the temperature in said comfort zone, a zone setpoint temperature means for generating a second signal representing a preferred temperature of each of said plurality of comfort zones and a determination means for calculating an error signal as a function of said first signal and said second signal.

10. A zone control apparatus as recite in claim 8 wherein said zone control means is a duct damper, one for each of said plurality of comfort zones for a forced air heating/cooling plant.

11. A zone control apparatus as recited in claim 8 wherein said zone control means is a valve, one for each of said plurality of comfort zones for a hydrophonic heating/cooling plant.

12. A zone control apparatus as recited in claim 9 wherein said determining means calculates the difference between said first signal and said second signal as said error signal.

13. A zone control apparatus as recited in claim 9 wherein said determining means calculates the integral of the difference of said first signal and said second signal as said error signal.

14. A zone control apparatus to supply conditioned air to a plurality of comfort zones comprising:

a plurality of comfort zones;

an air temperature conditioning means for modifying the temperature of circulating air;

a distribution means for proportioning said air from said air temperature conditioning means to each of said plurality of comfort zones;

means for circulating said air to cause air to flow through said distribution means to said plurality of comfort zones;

a plurality of dampers, one for each of said plurality of comfort zones, for closing off the flow of air to each of said plurality of comfort zones;

a temperature setting means in each of said plurality of comfort zones for setting a preferred temperature for each of said plurality of comfort zones;

a temperature measuring means in each of said plurality of comfort zones for measuring the actual temperature in each of said plurality of comfort zones;

means for calculating an error determining error signal for each of said plurality of comfort zones, each of said error signals being a function of the difference between said preferred temperature and said actual temperature for each of said plurality of comfort zones;

a time calculation means for determining a duct damper open time for each of said plurality of comfort zones;

an error selection means for selecting a comfort zone having the greatest error signal and designating said one of said plurality of comfort zones as a zone of greatest thermal error (ZGTE) and for designating all remaining comfort zones as zones of lesser thermal error (ZLTE);

a first duct damper opening means for opening said plurality of duct dampers when said air temperature conditioning means is turned on;

a second duct damper opening means for maintaining said duct damper of said zone of greatest thermal error open at all times;

a first duct damper closing means for selectively closing each of said plurality of duct dampers of the zones of lesser thermal error when the error signal of said zone of lesser error is zero or when the duct damper open time for the zone of lesser thermal error has been exceeded and for maintaining said duct damper closed until said air temperature conditioning means has been turned off and again turned on;

a first plant switching means for turning off the air temperature conditioning means when the error signal for the zone of greatest thermal error equals zero; and a second plant switching means for turning on the air temperature conditioning means when the error signal of the zone of greatest thermal error exceeds a predetermined differential switching error.

15. A method of controlling the temperature in a plurality of comfort zones comprising the steps of:

generating an error signal for each of a plurality of comfort zones, wherein said error signal is a function of the difference between a measured temperature and a preferred setpoint temperature;

providing a zone control device for each of said plurality of comfort zones;

determining a zone of greatest thermal error from said error signals as opposed to zones of lesser thermal error;

opening the zone control device of the zone of greatest thermal error; and selectively closing the zone control devices of the zones of lesser thermal error, wherein the error signal for each of the zones of lesser thermal error reaches zero, or when a predetermined open time has been exceeded.

16. A method of controlling the temperature in a plurality of comfort zones as recited in claim 15, wherein the step of generating an error signal includes determining the difference between a preferred setpoint temperature and a measured temperature.

17. A method of controlling the temperature in plurality of comfort zones as recited in claim 15, wherein the step of generating an error signal includes integrating the difference between a preferred setpoint temperature and a measured temperature.

18. A method of controlling the temperature in a plurality of comfort zones comprising the steps of:

providing a plurality of comfort zones;

providing a plurality of zone temperature sensors, one in each of said plurality of comfort zones;

providing a plurality of zone setpoint temperature input means, one in each of said plurality of comfort zones:

providing a plurality of zone control means, each for controlling one of said plurality of said comfort zones;

determining a zone temperature error for each of said plurality of comfort zones from said zone temperature sensors and said temperature input means;

determining a zone of greatest thermal error based upon said zone temperature error; designating the remaining comfort zones as zones of lesser thermal error;

opening the zone control means for the zone of greatest thermal error; and selectively closing the zone control means for each of the zones of lesser thermal error when said error signal for that zone equals zero.

19. A method of controlling the temperature in a plurality of comfort zones as recited in claim 18, wherein said step of determining a zone temperature error includes integrating the difference between the zone temperature sensor and said temperature input means to determine a temperature error for each of said plurality of comfort zones.

20. A method of controlling the temperature in a plurality of comfort zones comprising the steps of:

measuring the temperature in each comfort zone and creating a first signal representative of the temperature measured;

setting a preferred temperature for each of the comfort zones and generating a second signal representative of a preferred setpoint temperature;

determining an error signal by calculating the difference between the first signal and the second signal for each of the comfort zones;

determining the zone of greatest thermal error as the comfort zone having the greatest error;

designating the remaining comfort zones as zones of lesser thermal error;

turning on a heating/cooling plant to supply temperature conditioned air to each comfort zone when the error of the zone of greatest thermal error exceeds a predetermined level;

providing an air flow control means in each of said comfort zones;

opening the air flow control means for each zone when the heating/cooling plant is turned on;

maintaining the air control means for the zone of greatest thermal error open during the heating/cooling plant on cycle;

selectively closing the air flow means to each of the zones of lesser thermal error when the error signal for that particular comfort zones equals zero; and turning off the heating/cooling plant when the error signal for the zone of greatest thermal error equals zero.

21. A method for controlling the temperature in a plurality of comfort zones as recited in claim 20, wherein the step of determining the zone of greatest thermal error is sequentially determined by polling each of the zones of lesser thermal error, closing their respective dampers as required, eliminating zones of lesser thermal error whose duct dampers have been closed and recalculating a zone of greatest thermal error from those zones whose duct dampers are open.

* * * * *

UNITED STATES PATENT AND TRADEMARK OFFICE
CERTIFICATE OF CORRECTION

PATENT NO. : 5,318,104
DATED : June 7, 1994
INVENTOR(S) : Dipak J. Shah, J. Ward MacArthur, Robert L. Buchholz, Eric W. Grald, Lorne W. Nelson It is certified that error appears in the above-indentified patent and that said Letters Patent is hereby corrected as shown below:

Column 8, line 62 (claim 6), after "claim" please insert --1--.
Column 9, line 19 (claim 9), before "zones" please insert --comfort--.
Column 9, line 26 (claim 10), cancel "recite" and substitute --recited--.

Signed and Sealed this

Thirteenth Day of June, 1995

Attest:

BRUCE LEHMAN

Attesting Officer

Commissioner of Patents and Trademarks